United States Patent
Lindquist et al.

[11] Patent Number: 6,104,372
[45] Date of Patent: Aug. 15, 2000

[54] ARRANGEMENT FOR SOLAR CELL DRIVEN DISPLAY

[76] Inventors: Sten-Eric Lindquist, Kalkvagen 22, S-756 47 Uppsala; Anders Hagfeldt, Kolugnasvagen 100, S-741 41 Knivsta, both of Sweden

[21] Appl. No.: 08/894,081

[22] PCT Filed: Feb. 12, 1996

[86] PCT No.: PCT/SE96/00177

§ 371 Date: Oct. 31, 1997

§ 102(e) Date: Oct. 31, 1997

[87] PCT Pub. No.: WO96/25730

PCT Pub. Date: Aug. 22, 1996

[30] Foreign Application Priority Data

Feb. 13, 1995 [SE] Sweden .................................. 9500509

[51] Int. Cl.[7] .............................. G09G 3/04; G09G 3/36
[52] U.S. Cl. ............................................. 345/104; 345/33
[58] Field of Search .................................. 345/211, 104, 345/33

[56] References Cited

U.S. PATENT DOCUMENTS

| | | | |
|---|---|---|---|
| 3,757,511 | 9/1973 | Burgess et al. ............................. | 368/83 |
| 4,095,217 | 6/1978 | Tani et al. .................................. | 345/87 |
| 4,740,431 | 4/1988 | Little .......................................... | 429/9 |
| 4,916,035 | 4/1990 | Yamashita et al. ....................... | 429/111 |
| 5,072,209 | 12/1991 | Hori et al. .................................. | 345/8 |
| 5,084,365 | 1/1992 | Gratzel et al. ........................... | 429/111 |
| 5,160,920 | 11/1992 | Harris ........................................ | 345/117 |
| 5,192,944 | 3/1993 | Otsuki et al. ............................. | 340/765 |
| 5,215,821 | 6/1993 | Ho ............................................. | 428/432 |
| 5,483,263 | 1/1996 | Bird et al. ................................ | 345/207 |
| 5,812,109 | 9/1998 | Kaifu et al. .............................. | 345/104 |

FOREIGN PATENT DOCUMENTS

| | | |
|---|---|---|
| 0197465 | 10/1986 | European Pat. Off. . |
| 91/16719 | 10/1991 | WIPO . |

*Primary Examiner*—Mark R. Powell
*Assistant Examiner*—Anthony J. Blackman
*Attorney, Agent, or Firm*—Young & Thompson

[57] ABSTRACT

A solar cell driven display is provided with battery backup, where the included components, solar cell and/or battery forms an integrated system based on porous titanium dioxide or other metal oxide films. The solar cell charges the battery and/or operates as a power source for the display. The solar cell and battery as display each include a pair of film electrodes on, for example, glass. They are interconnected by an electrolyte, which brings about charges between the paired electrodes. The solar cell is of a photoelectrochemical type and the battery of a rocking-chair type. By intercalation, for example, by lithium ions in the oxide film it is colored, for example, titanium dioxide becomes blue. Then it may simultaneously operate as a display portion but also as a portion in an electrochemical element of a battery. The solar cell may operate directly with the oxide as a photoactive electrode, titanium dioxide being active in the UV range, but the oxide may also be coloring matter sensitized to absorb light in the visible wavelength range. The display portion may also be provided with coloring matter, which upon reception or emission of electrons changes color.

8 Claims, No Drawings

ARRANGEMENT FOR SOLAR CELL DRIVEN DISPLAY

TECHNICAL FIELD

The present invention relates to a display device, and more exactly to a display combined with solar cell and/or battery.

BACKGROUND OF THE INVENTION

Displays which may present numbers, letters and/or other symbols have got a fast growing use in many different connections. This has resulted in a need of different display types for different purposes.

For example for pocket calculators the requirements are that the switch-over time should be below 1 second, that readability should facilitate quick reading, that battery consumption should be low and that reading should be possible for all levels of ambient light, which are considered "bright". The type of display which best has fulfilled these requirements is liquid crystal displays. That type therefore has become increasingly dominating for this purpose.

For instance, for signs in public environments, e.g. at stations and airports, the requirements on symbol size, readability and independence of ambient light are very high, while the requirement of quick switch-over is considerably less than for pocket calculators. Therefore electromechanical displays are used in many applications.

A display utilization which at present is relatively rare but is expected to get a very fast increase is price-marking of merchandise, e.g. in the form of electronic shelf edge labels.

The requirements of price-marking displays differ in several aspects from the requirements of displays for other purposes.

The presentation of price-marking displays should be able to be changed in a simple way by signal transmissions from a central computer, which controls that the display presents the price, which is registered at the cash-desk. But changes of the price is performed relatively seldom, normally at an interval of more than a week.

Consequently, the requirement for switch-over time by a price-marking display is very low. If it is decided not to perform any price changes during hours of open shop, all price changes may be performed in the night, when the displays do have several hours for switch-over.

In contrary the requirement of low power consumption for unchanged presentation is very high. The displays should be able to be positioned at the shelf edges and operate for years without changes of battery, without any wire connections and without radiating electric fields, which may have undesired effects.

Also the requirements of good contrast and clarity are very high for electronic price marking labels. A display which should tempt buying should not annoy the customer by difficulties to be read.

A way to fulfil the requirements of low power consumption for unchanged presentation and of good contrast is to utilize an electrochemical display.

By drawing current, at selected segments, through a suitable electrolyte it is possible to achieve reversible changes of colour, which remain until a current is drawn in the opposite direction. Thus, in this way, by means of an electric signal, the colour of the elements of the display may be chosen.

PRIOR ART

U.S. Pat. No. 3,757,511, issued 1973 to R. R. Burgess et al., discloses a light emitting diode timepiece display in which the output of the light emitting diode display is controlled with respect to ambient lighting conditions so as to provide the maximum amount of contrast with minimum amount of power consumption. There is further provided a series of solar cells on the face of the display, which recharge the timepiece batteries during ultra-high ambient light conditions and which supply additional power to the light emitting diodes during high ambient lighting conditions so as to increase the output of the light emitting diodes. However this concept still requires a discrete system battery to be able to operate the light diodes of the device and such a device is still not fulfilling the requirements sketched above for instance for an electronic shelf edge label.

Another document EP 0 197 465 filed 1986 discloses a solid electrochemically reactive material, which contains polymeric metal complex consisting of complex cation represented by a general formula of $M_A{}^x (L_A{}^a)1$. The electrochemically reactive thin film is used as a dielectric membrane for a secondary battery and for an electrochromic display device.

To obtain a display for an electronic price marking label a suitable system is intercalation of lithium in titanium dioxide. By applying a negative voltage to a porous titanium dioxide in an electrolyte containing lithium ions colorless lithium ions will migrate into the titanium dioxide (intercalation) and give that a clear blue colour. Another well known system utilizes a solution of $Na_2SO_4$ and phenolphthalein. If two electrodes are positioned in this solution a red colouring takes place around the negative electrode. This method is well known for defining battery poles and the like, and paper impregnated with this solution is called "pole paper".

Thus, there are ways to achieve electrochemical displays which would work well, e.g., as price-marking displays and which also might be serious competitors to electromechanical displays for public display systems.

An important problem with shelf edge displays (and other public displays) is that they need to be powered during an unlimited time without cords or the like. The most simple way to achieve this is to provide them with some type of solar cell, which can utilize ambient light.

Today there are shelf edge displays where a solar cell is positioned nearby to the display device surface. Experiments are also performed in which a partly transparent solar cell is positioned in front of the display, e.g., a colouring matter sensitized solar cell with electrolyte. However, both methods do have obvious disadvantages. To place a solar cell along the display demands surface in addition to what is needed for the display. To position a semitransparent cell in front means that the contrast of the display is deteriorated. This is a very serious problem in a situation of marketing where it is a desire that the display should transfer a clear and distinct message to the customer.

To keep the requirement of solar cell surface down, also some type of battery is needed. If a small solar cell is used there is a need to store electricity during long time to have access to enough power during the power consuming phase, when the display changes its presentation.

Consequently, a display for, e.g., shelf edge marking, should comprise: addressable display elements, solar cell for powering, an accumulator battery, and logic circuitry. The accumulator according to the state of the art may be comprising a capacitor, or an accumulator battery.

It is important that the main portion of the available surface primarily will be utilized for presentation of symbols, e.g., numbers. Therefore it will desirable to integrate other surface demanding functions such as display elements, solar cell and battery within the same surface.

SUMMARY OF THE INVENTION

The object of the present invention is to present an improved display suitable, e.g., for electronic price marking labels and the like in which the display presenting symbols, comprises electronic circuitry and a solar cell and/or battery, whereby the available surface is divided into symbol segments and background elements and where at least a part of the surface of the background elements is utilized for one or more solar cells, wherein the function and design of battery cells and a display elements are identical using a first type of electrolyte, whereby an inactive coloured display element operates as a battery element together with additional background elements of the symbols, wereby the battery element is using said first type of electrolyte, and that a portion of the background using a second type electrolyte or alternatively said first type of electrolyte serves as a solar cell, from which the energy not directly used is stored in said battery cells, and upon switch-over of a display element, from an inactive coloured to an active transparent state, the stored energy is distributed to other inactive coloured display elements serving as battery cells.

According a second object of the present invention the display segments, solar cell portion and/or battery portion contain on top of a first conducting layer a second layer of a porous material, preferably a semiconductor, e.g., $TiO_2$, $ZnO$, $Nb_2O_5$, $WO_3$, $SnO_2$.

According a third object of the present invention the display segments contain a lithium electrolyte, whereby segments when inactive will be coloured blue by intercalation of lithium in the layer of porous material.

According a fourth object of the present invention the colouring of the display elements takes place by surface modification of films of porous material, preferably modifying molecules such as viologens or metal oxide clusters.

Additional embodiments of the present invention are established by the dependent claims.

DETAILED DESCRIPTION OF THE PRESENT INVENTION

If a display should be able to present arbitrary patterns the entire surface must consist of addressable points. If it should be able to only present a limited number of symbols having certain common characteristics the call for each surface element being addressable decreases.

For instance we are used to that numbers are presented by means of seven-segment symbols. Thus, to display a number we only need seven addressable surfaces and between those there is surface always forming background. By always positioning the numbers at same position in the display we also obtain surfaces between the numbers which always will form a background.

For instance on a shelf edge display which may present seven-segment numbers there will be background surface both in each number and between the numbers. This background surface may be utilized as solar cell surface or battery surface.

When producing a display in which the background surface is utilized as solar cell and/or battery it is important that these three functions are achieved in a similar way such that a combination of production methods difficult to combine in the same product will be avoided.

A film of porous titanium oxide on top of another conducting layer has the characteristics that it may constitute a display element, a solar cell or a battery cell.

A thin porous titanium dioxide film in an electrolyte containing lithium may operate as a display element. If a negative voltage is applied to the titanium dioxide film lithium will be intercalated and the transparent titanium dioxide film becomes blue. During this process the element draws current but when it is saturated with lithium the state may be maintained without current consumption if the element is disconnected or the applied voltage is kept equal to the emf which is obtained if lithium is allowed to return to the electrolyte.

It has earlier been established that a titanium dioxide layer in an electrolyte may be utilized a solar cell (e.g. U.S. Pat. No. 5,084,365 issued to Grätzel et al., 1992). For such a cell to be able to convert visible light it is necessary to utilize a colouring matter which provides electron states in the band gap of the titanium dioxide. For example for shelf edge displays there is also a possibility to utilize colourless titanium dioxide, which thus only may make use of the UV portion of the light. Then it is necessary to use an illumination which contains a certain amount of UV light, but if this amount is less than the UV proportion in ordinary daylight it should be of no objection.

Intercalation of lithium in titanium dioxide is a reversible process which may be used for accumulation of electricity. A segment in a display which has been made blue by intercalation of lithium is simply a charged battery cell. If the titanium dioxide and the electrolyte is connected to an external circuit comprising a resistor, lithium will leave the titanium dioxide and enter the electrolyte as lithium ions. Then the electrons which these lithium ions simultaneously extract from the titanium dioxide will be driven through the external circuit. Thus, the unit operates like an ordinary battery cell.

If a portion of the surface is used as battery this surface will then be blue when the battery is charged and transparent or white (dependent on particle size) when the battery is discharged. As one has to have a certain spare capacity all battery surfaces will be blue in normal operation of the display. If it is desired to utilize surfaces in and between the symbol segments as battery also a blue background will be resulting. "Lit" symbol segments will be discharged transparent or white segments. In a first embodiment of the present invention by putting a yellow ground under the segments, yellow numbers against a blue background are obtained.

Notice that this type of display may be arranged having very low energy consumption, as from the elements to be made transparent the energy may be made use of and be utilized for distribution to elements to be coloured blue when switching over the display to a new presentation. This will be performed by means of electronic circuitry well known for a person skilled in the art.

Another type of display based on porous $TiO_2$ films is modification of the $TiO_2$ surface by molecules which may be coloured or transparent dependent on the potential applied to the $TiO_2$ film.

A combination of battery/solar cell/display within the same surface area according to the present invention may be produced in the following way:

Onto a conducting surface layer is put a material layer of porous titanium dioxide. (A process for making a photoelectrochemical cell is for instance disclosed in the description by Grätzel et al. in U.S. Pat. No. 5,084,365). On top of this titanium layer is put a second conducting surface and an electrolyte containing lithium is filled in between the conducting surfaces. At least one of the surfaces must be transparent. In a preferred embodiment this transparent layer with an additional counter electrode in a sandwich structure is preferably protected by a thin plate of glass. For sectioning into display elements and sectors having different functions at least one of the conducting surfaces must be divided into individually connectable segments. In the preferred embodiment the conducting layer opposite to the transparent layer will be divided into the necessary segments, which will be connected to the driving circuitry according to standard methods well known by a person skilled in the art.

The operation and build-up of battery cells and display segments primarily in the same plane are identical and both then utilize the same type of electrolyte. Thus, it is not necessary for the operation of the device to delimit spaces of electrolyte at the borders between defined different display segments or at the boundary between display elements and battery cells. However, electron motion of $TiO_2$ particles may create a certain spread sidewise, which may reduce the sharpness at the boundary of a display element and therefore for certain designs it may be appropriate to delimit the display element.

In a first embodiment of the present display the solar cell portion is formed by means of a colouring matter sensitized solar cell containing electrolyte according to established technique known by a person skilled in the art, while in a second embodiment the solar cell portion constitutes an UV sensitive solar cell containing an electrolyte and transparent or white titanium dioxide dependent on particle size, which will operate on a minor portion of UV light in the ambient light. The solar cell in a first combination with the first and second embodiments will be in the same plane as the display segments and battery elements, while in a second combination the solar cell will be placed on top of the layer containing the display segments and battery elements. Such a thin solar cell will be fully transparent or slightly coloured and will still tranfer a clear and distinct message. The electrolyte may be highly viscous to solid and should preferably contain lithium, but could as well contain other ions. In embodiments having the solarcell on top of the display segments/battery cells the surface of the solarcell preferably will slightly larger than the display surface for allowing wiring out of sight. Such embodiments of course permit simple series connection of segmenteted solar cells.

Concerning the solar cell portions the requirements of electrolyte could differ compared to electrolyte for display elements and battery cells. In a further embodiment still within the scope and spirit of the present invention it is quite conceivable that a person skilled in the art will be able to suggest other suitable electrolytes, which may be used for the purpose both of solar cell and display/battery segments and which consequently should then permit removal of all delimitations of electrolyte within a display device according the present disclosed embodiment of the invention when solar cell, display segments and battery cell are in the same plane.

An advantage, when in the suggested way making the transparent conducting surface unsegmented, is that no connection wires will be sighted. All individual connections may then be performed at the back of an opaque sectioned conducting surface. One disadvantage is that a transparent unsegmented conducting surface of this type normally does have a high resistance. Thus, there might be a large voltage drop when current is applied or drawn. If a slow switch-over of the presentation is accepted the currents will still become so low that this does not present any serious problem.

Another problem of having a common unsegmented conducting surface for the entire unit is that it is not possible to connect solar cells and battery element in series. Consequently in such a case, it will be necessary to operate at a voltage which at least corresponds to the emf produced by lithium intercalated titanium dioxide (about 2 V for Li). To colour a display element blue this voltage has to be exceeded to ensure that the battery cell constituted by the segment really will be electrically charged. To be able to utilize one common conducting surface for the entire unit there must be provided some type of voltage converter which may increase the voltage from about 2 V.

If only a single common conducting surface for the entire unit is used, current from the solar cell portion at barely 1 V must be kept and this voltage must be converted to a sufficiently high voltage to charge the battery portion as well as change colour segments blue and drive logical circuits. Consequently, voltage converters which may operate at a input voltage below 1 V must be used.

If a division of the solar cell portion and/or the battery portion will be accepted the elements may be connected in series to provide a higher voltage.

Another way to solve the voltage problem is to utilize display elements which require lower voltage than what is presented by the solar cell and battery portions. It should be mentioned here that displays based on surface modified $TiO_2$ films do not need as high a voltage as displays based on intercalation of Li.

In the detailed description of solar cell portion and/or battery portion according to the present invention a layer of a porous material containing $TiO_2$ has been demonstrated but a person skilled in the art will realize that a porous material containing other materials than $TiO_2$ may be utilized, for example $ZnO$, $Nb_2O_5$, $WO_3$, or $SnO_2$. A number of semiconductor materials are expected to be possible to use for at least one of the layers constituting a display device containing the disclosed combination of battery/solar cell/display.

What is claimed is:

1. A display device for the presentation of symbols, including a plurality of electrochemical cells, at least one of which functions as a display element and/or a battery, and at least one other of which functions as a photo-electrochemical cell, and further including electronic drive and control circuitry, said electrochemical cells comprising a plurality of individually connectable conductive surface segments;

a porous semiconductor layer provided on each said conductive surface segment;

a counter electrode comprising a conducting surface layer provided in close proximity to said semiconductor layer;

a first electrolyte disposed between said conducting surface layer and said semiconductor layer, and in contact with a fraction of said conductive surface segments, thereby constituting display elements and/or battery elements; and a second electrolyte disposed between said conducting surface layer and said semiconductor layer, and in contact with a remaining fraction of said conductive surface segments thereby constituting said photo-electrochemical cell.

2. The display device as claimed in claim 1, wherein at least one of said conductive surface segments and said counter electrode is transparent.

3. The display device as claimed in claim 1, wherein said semiconductor layer comprises a porous material selected from the group consisting of $TiO_2$, $ZnO$, $Nb_2P_5$, $WO_3$, and $SnO_2$.

4. The display device as claimed in claim 1, wherein said first electrolyte comprises a lithium electrolyte, whereby said conductive segments in contact with said first electrolyte are capable of being colored blue by intercalation of lithium into said semiconductor layer.

5. The display device as claimed in claim 1, wherein said first electrolyte comprises a lithium electrolyte, whereby said conductive surface segments in contact with said first electrolyte are capable of being electrically charged by intercalation of lithium into said semiconductor layer.

6. The display device as claimed in claim 1, wherein said semiconductor layer is dye sensitized.

7. The display device as claimed in claim 1, wherein said control circuitry comprises means for switching between display and battery function.

8. A combined display, battery and solar cell device, comprising at least one electrochemical cell comprising
a first conductive surface segment on which there is provided a porous first semiconductor layer, in contact with a first electrolyte; and
a first counter electrode;
said electrochemical cell having the property of changing color when suitably activated, and further having the capability of storing electrical energy, thereby functioning as a battery;

at least one photo-electrochemical cell comprising
a second conductive surface segment on which there is provided a porous second semiconductor layer, in contact with a second electrolyte; and
a second counter electrode;
said photo-electrochemical cell being capable of generating a driving voltage for said electrochemical cell when exposed to light; and electronic drive and control circuitry for activating selected ones of said electrochemical cell(s) to change color and/or to switch function to store electrical energy generated by said photo-electrochemical cell(s) wherein
all of said first and second conductive surfaces are made from the same material and all of said porous first and second semiconductor layers-are the same for all segments.

* * * * *